United States Patent
Lu et al.

(10) Patent No.: US 11,192,093 B2
(45) Date of Patent: Dec. 7, 2021

(54) TWO-DIMENSIONAL NITROGEN-DOPED CARBON-BASED TITANIUM DIOXIDE COMPOSITE MATERIAL, AND PREPARATION METHOD AND APPLICATION THEREOF FOR DEGRADING AND REMOVING ORGANIC POLLUTANTS IN WATER

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 129 days.

(21) Appl. No.: 16/659,068

(22) Filed: Oct. 21, 2019

(65) Prior Publication Data
US 2020/0122130 A1   Apr. 23, 2020

(30) Foreign Application Priority Data

Oct. 22, 2018   (CN) .......................... 201811232012.1

(51) Int. Cl.
*B01J 27/24*   (2006.01)
*B01J 35/00*   (2006.01)
(Continued)

(52) U.S. Cl.
CPC ............. *B01J 27/24* (2013.01); *B01J 35/004* (2013.01); *B01J 35/0013* (2013.01); *B01J 37/08* (2013.01);
(Continued)

(58) Field of Classification Search
CPC ...... B01J 27/24; B01J 35/004; B01J 35/0013; C02F 1/20; C02F 1/32
See application file for complete search history.

(56) References Cited

FOREIGN PATENT DOCUMENTS

CN          107433181 A   * 12/2017

* cited by examiner

*Primary Examiner* — Walter D. Griffin
*Assistant Examiner* — Cameron J Allen
(74) *Attorney, Agent, or Firm* — SZDC Law P.C.

(57) ABSTRACT

A preparation method of a two-dimensional nitrogen-doped carbon-based titanium dioxide composite material includes: (1) etching $Ti_3AlC_2$ with LiF/HCl to prepare two-dimensional transition metal carbide nanosheet; (2) preparing a nanosheet aggregate by electrostatic self-assembly of a two-dimensional transition metal carbide nanosheet and a positively charged nitrogen-containing cationic compound; (3) calcining the nanosheet aggregates to prepare a two-dimensional nitrogen-doped carbon-based titanium dioxide composite material. A method for degrading and removing organic pollutants in water includes (1) etching $Ti_3AlC_2$ with LiF/HCl to prepare two-dimensional transition metal carbide nanosheet; (2) preparing a nanosheet aggregate by electrostatic self-assembly of a two-dimensional transition metal carbide nanosheet and a positively charged nitrogen-containing cationic compound; (3) calcining the nanosheet aggregates to prepare a two-dimensional nitrogen-doped carbon-based titanium dioxide composite material; (4) placing the two-dimensional nitrogen-doped carbon-based titanium dioxide composite material into water containing organic pollutants to degrade and remove organic pollutants in water.

13 Claims, 6 Drawing Sheets

(51) Int. Cl.
 *B01J 37/08* (2006.01)
 *C02F 1/32* (2006.01)
 *C02F 1/72* (2006.01)
 C02F 101/34 (2006.01)
(52) U.S. Cl.
 CPC ............... *C02F 1/32* (2013.01); *C02F 1/725* (2013.01); *C02F 2101/345* (2013.01); *C02F 2305/10* (2013.01)

TWO-DIMENSIONAL NITROGEN-DOPED CARBON-BASED TITANIUM DIOXIDE COMPOSITE MATERIAL, AND PREPARATION METHOD AND APPLICATION THEREOF FOR DEGRADING AND REMOVING ORGANIC POLLUTANTS IN WATER

This application claims priority to Chinese Patent Application No.: 201811232012.1, filed Oct. 22, 2018, which is incorporated by reference for all purposes as if fully set forth herein.

FIELD OF THE INVENTION

The invention relates to the technical field of inorganic nanocomposite materials, in particular to a two-dimensional nitrogen-doped carbon-based titanium dioxide composite constructed in situ by one-step method, its preparation method and photocatalytic degradation and removal of organic pollutants in water.

TECHNICAL BACKGROUND

The utilization of solar energy and the treatment of environmental pollution are important issues facing humanity. How to use the power of the sun to solve environmental pollution has become a hot topic of concern. Photocatalytic technology is a new pollution control technology with mild conditions, low energy consumption and environmental friendliness. Its core is photocatalytic materials. Therefore, the development of photocatalytic materials with high efficiency, stability and low price will bring enormous environmental and social benefits. As a promising environment-friendly photocatalyst, titanium dioxide ($TiO_2$) has many advantages such as high photocatalytic activity, good chemical stability, safety, non-toxicity and low cost. It is widely used in wastewater treatment, air purification, self-cleaning surface, dye sensitization and other fields.

However, the forbidden band width of $TiO_2$ (about 3.2 eV) is large, and only absorbs 5% of sunlight; its photogenerated electrons and holes have a high probability of recombination, resulting in low utilization efficiency of photogenerated carriers. Therefore, how to effectively improve the solar energy utilization rate and photon efficiency of $TiO_2$ is a key scientific issue for promoting the large-scale application of $TiO_2$ photocatalyst in the environment and energy fields.

SUMMARY OF THE INVENTION

The object of the present invention is to provide a two-dimensional nitrogen-doped carbon-based titanium dioxide composite in situ constructed by one-step method and a preparation method thereof. $Ti_3C_2$ MXene, as a 2D layered material containing both Ti and C in its own structure, has the characteristics of negative charge and easy oxidation. $Ti_3C_2$ MXene nanosheet of nitrogen containing cationic compounds with positive charge on the surface of electrostatic self-assembly are directly converted into nitrogen-doped carbon-based titanium dioxide $N—(C/TiO_2)$ composites under controlled oxidation conditions. The invention expands the response range of titanium dioxide in the visible light region through element doping, improves its absorption and utilization efficiency of light, thereby improving the photocatalytic performance, and overcomes the problems of wide band gap and low utilization ratio of visible light of titanium dioxide. In order to solve the problem of easy recombination of photoelectrons and holes in titanium dioxide, carbon-based titanium dioxide composites ($C/TiO_2$) are prepared by loading nano-carbon-based materials with excellent conductivity and large specific surface area, which is an effective modification method.

In order to achieve the above purposes, the present invention has following specific technical solution:

A preparation method of a two-dimensional nitrogen-doped carbon-based titanium dioxide composite material, comprising the following steps:

(1) etching $Ti_3AlC_2$ with LiF/HCl to prepare two-dimensional transition metal carbide nanosheet;

(2) preparing a nanosheet aggregate by electrostatic self-assembly of a two-dimensional transition metal carbide nanosheet and a positively charged nitrogen-containing cationic compound;

(3) calcining the nanosheet aggregates to prepare a two-dimensional nitrogen-doped carbon-based titanium dioxide composite material.

A method for degrading and removing organic pollutants in water, comprising the following steps:

(1) etching $Ti_3AlC_2$ with LiF/HCl to prepare two-dimensional transition metal carbide nanosheet;

(2) preparing a nanosheet aggregate by electrostatic self-assembly of a two-dimensional transition metal carbide nanosheet and a positively charged nitrogen-containing cationic compound;

(3) calcining the nanosheet aggregates to prepare a two-dimensional nitrogen-doped carbon-based titanium dioxide composite material;

(4) placing the two-dimensional nitrogen-doped carbon-based titanium dioxide composite material into water containing organic pollutants to degrade and remove organic pollutants in water.

In the above technical solution, in the step (1), the molar ratio of $Ti_3AlC_2$ to LiF is (7-15): 1, preferably 12:1; the concentration of HCl is 6-9 mol/L, preferably 9 mol/L; the etching temperature is 20-35° C., preferably 35° C.; the etching time is 24-48 h, preferably 24 h; preferably, first adding LiF into HCl solution, stirring for 5 minutes to make the solution mix evenly, and then adding $Ti_3AlC_2$ for etching, the time of adding $Ti_3AlC_2$ is 5 min.

The present invention firstly uses LiF/HCl to etch $Ti_3AlC_2$ to prepare $Ti_3C_2$ MXene. The LiF/HCl etching method is milder and safer than the HF etching method, and the $Li^+$ spontaneous intercalation during the preparation process so that it does not require additional intercalation or ultrasonic layering. It can be layered by etching and has good repeatability. Therefore, the nanosheet prepared by LiF/HCl etchant has larger specific surface area. Compared with traditional two-dimensional materials, MXene has excellent metal-like conductivity and its surface-rich functional groups such as —F and —OH also gives it excellent chemical reactivity. MXene has a large specific surface area and provides more adsorption sites and catalytically active sites to promote catalytic performance and are a good carrier material.

In step (2), the mass ratio of nitrogen-containing cationic compounds to $Ti_3C_2$ MXene nanosheet is 4:1; preferably, first preparing the nitrogen-containing cationic compound into a homogeneous solution, then mixing it with $Ti_3C_2$ MXene, stirring, centrifuging to get the precipitate, and freeze-drying to prepare nanosheet aggregate.

The present invention adopts a simple electrostatic self-assembly method to insert nitrogen-containing cationic compounds into the interlayer of $Ti_3C_2$ MXene nanosheet, effectively inhibits the stacking between the nanosheet, enlarges the interlayer spacing of the nanosheet, and obtains a clear porous structure and a higher specific surface area.

In step (3), freeze-dried nano-sheet aggregates are roasted in a high temperature tubular furnace with $CO_2$ as the roasting atmosphere, 75-90 sccm as the flow rate, 550-700° C. as the roasting temperature, 6-10° C./min as the heating rate, 2-4 h as the final natural cooling. Thus, the loading of titanium dioxide on the surface of carbon-based materials at the molecular level and the simultaneous nitrogen doping of carbon-based and titanium dioxide can be realized by one-step method.

The invention further discloses the application of one-step in-situ construction of two-dimensional nitrogen-doped carbon-based titanium dioxide composite material in degrading and treating pollutants in water, preferably, the pollutant is phenol.

The advantages of the present invention are as follows:

1). In the method for preparing a two-dimensional nitrogen-doped carbon-based titanium dioxide composite material by the one-step method disclosed in the present invention, the LiF/HCl etching method is milder and safer than the HF etching method. During the preparation process, $Li^+$ spontaneous intercalation eliminates the need for additional intercalation intercalation and its ultrasonic layering. It can be layered by hand and has good repeatability. Therefore, the nanosheet prepared by LiF/HCl etchant are large in size, and compared with the conventional two-dimensional materials, MXene has excellent metal-like conductivity, and the surface-rich functional groups such as —F and —OH also give it Excellent chemical reactivity; MXene has a large specific surface area to provide more adsorption sites and catalytic active sites to promote catalytic performance, and is a good carrier material.

2) A two-dimensional nitrogen-doped carbon-based titanium dioxide composite material is constructed in situ by the one-step method disclosed in the present invention. Nitrogen-containing cationic compounds are inserted into the interlayer of $Ti_3C_2$ MXene nanosheet by a simple electrostatic self-assembly method, effectively inhibiting the stacking between the nanosheet, increasing the interlayer spacing of the nanosheet, and obtaining a higher specific surface area.

3) The invention is based on $Ti_3C_2$ MXene, and a two-dimensional nitrogen-doped carbon-based titanium dioxide composite material is constructed in one step. Ti and C are homologous, which not only retains the advantages of the original carbon material, but also causes in-situ growth to make the load firm, uniform dispersion, and difficult to agglomerate; nitrogen doping is to shift the $TiO_2$ light absorption range to the visible region. The process has a performing effect, which further increases the specific surface area of the composite and has more photocatalytic active sites.

4) The present invention constructs two-dimensional nitrogen-doped carbon-based titanium dioxide composite materials in situ by one-step method, realizes nitrogen-doping of $TiO_2$ and its loading on the surface of carbon materials simultaneously, thereby improving the absorption of $TiO_2$ in the visible light range and its photoquantum efficiency, overcoming two major drawbacks of $TiO_2$ photocatalyst at one time, and making the titanium dioxide photocatalyst more widely used in environmental purification.

DETAILED DESCRIPTION OF THE INVENTION

Embodiment 1

Preparation of two-dimensional $Ti_3C_2$ MXene nanosheet.

0.8 g lithium fluoride is added into 10 ml 9 mol/L HCl and stirred for about 5 minutes. $Ti_3AlC_2$ is added in batches within 5 minutes. Then the reaction is stirred at room temperature for 24 hours to etch. The reaction products are ished by centrifugation with water. When pH is 6 or so, ultra-pure water is added. After 10 minutes of hand shaking, the solution is layered and centrifuged again, the two-dimensional transition metal carbide $Ti_3C_2$ MXene is obtained. The black colloidal suspension is stored in a refrigerator at 4° C.

Figure 1:
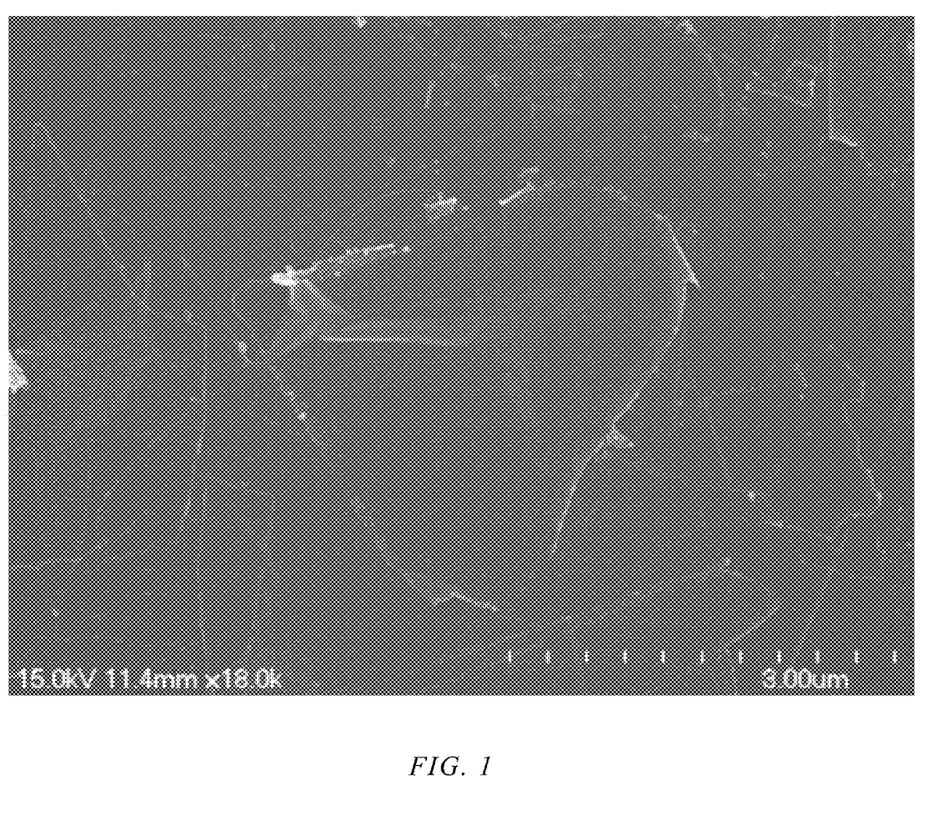
FIG. 1 is a SEM image of $Ti_3C_2$ MXene nanosheet.
Figure 2:
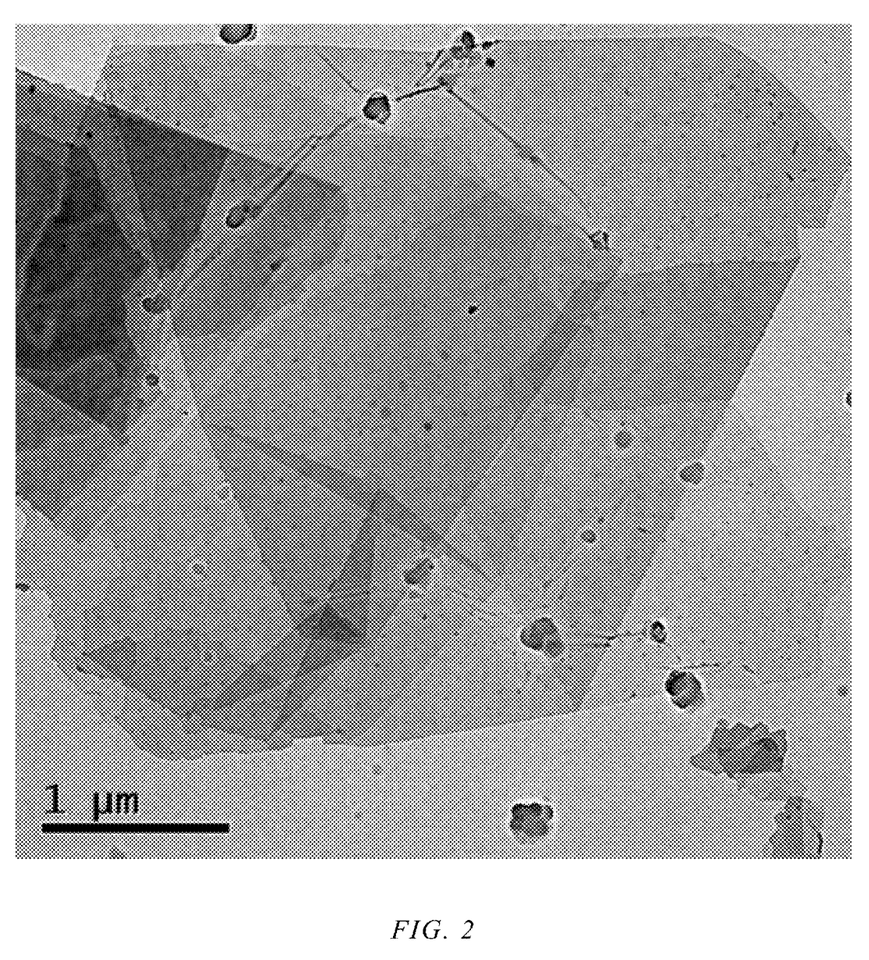
FIG. 2 is a TEM of $Ti_3C_2$ MXene nanosheet.

FIG. 1 is a SEM image of $Ti_3C_2$ MXene and FIG. 2 is a TEM image of $Ti_3C_2$ MXene. From the above figure, it can be seen that $Ti_3C_2$ MXene is a two-dimensional layered material. The thickness of the nanosheet is in the nanometer scale, the size of the plane is in the micron level, with fewer surface defects and larger specific surface area.

Embodiment 2

Protonation of melamine and its Electrostatic self-assembly with $Ti_3C_2$ MXene nanosheet.

Add 2 g of melamine to a 50 mL flask, add 30 mL of absolute ethanol, and stir vigorously for 1 h. Then, 3 mL of concentrated hydrochloric acid is added to the above mixed solution. The resulting mixture is further stirred for 1 h, then centrifuged, and transferred to an oven to evaporate the solvent; finally, the dried solid is ground into a powder and centrifuged several times with water and ethanol to obtain a protonated melamine as a nitrogen-containing cationic compound.

The protonated melamine is dissolved in 50 mL 0.1 M dilute hydrochloric acid, and the colloidal suspension 50 mL of $Ti_3C_2$ MXene nanotablets obtained in embodiment 1 is electrostatically self-assembled with protonated melamine according to the weight ratio of etched $Ti_3C_2$ MXene to protonated melamine as 1:4. When protonated melamine is added to the etched $Ti_3C_2$ MXene suspension, the positively charged protonated melamine is adsorbed on the surface of the negatively charged $Ti_3C_2$ MXene nanosheet, and the dispersed nanosheet precipitated in the aqueous solution. The nanosheet is collected by centrifugation and freeze-drying to obtain nanosheet aggregates.

Figure 3:
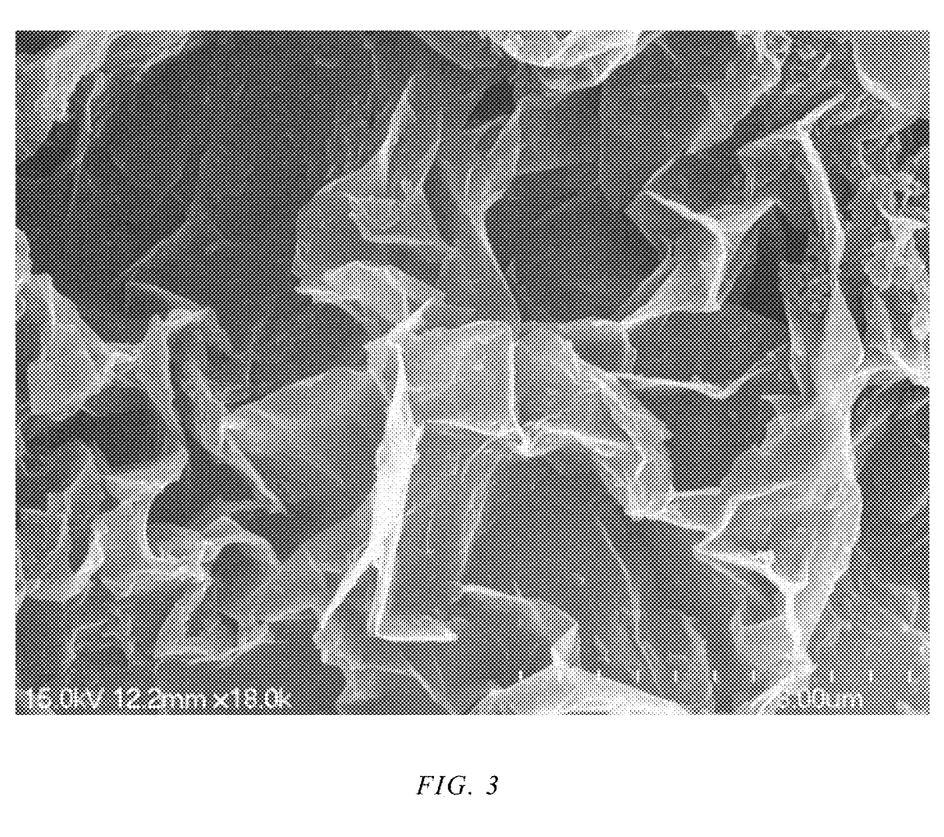
FIG. 3 is a SEM image of $Ti_3C_2$ MXene nanosheet after electrostatic self-assembly.

FIG. 3 is a SEM image of nanosheet aggregates obtained by electrostatic self-assembly of $Ti_3C_2$ MXene and protonated melamine. It can be found that after self-assembly, due to the insertion of the nitrogen-containing cationic compound; it becomes wrinkled, effectively reducing the stack between the $Ti_3C_2$ MXene nanosheet.

Embodiment 3

Preparation of two-dimensional nitrogen-doped carbon-based titanium dioxide composites (2D N—(C/TiO$_2$)).

Two-dimensional nitrogen-doped carbon-based titanium dioxide composites are synthesized by placing the above-mentioned freeze-dried nanosheet aggregates in a high temperature tubular furnace in a CO$_2$ atmosphere with the flow rate of 75 sccm, at a heating rate of 6° C./min to 550° C. for 4 h and cooling naturally.

Figure 4:
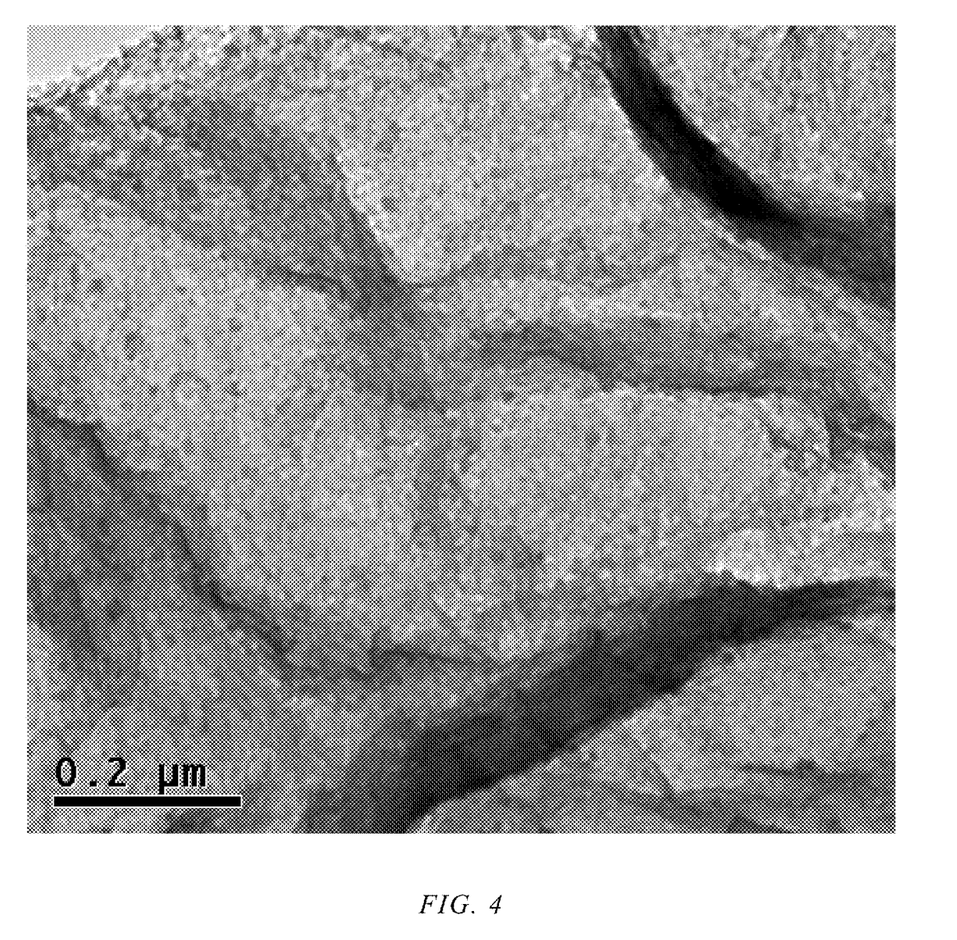
FIG. 4 is a TEM image of two-dimensional nitrogen-doped carbon-based titanium dioxide composite (2D N—(C/$TiO_2$)).
Figure 5:
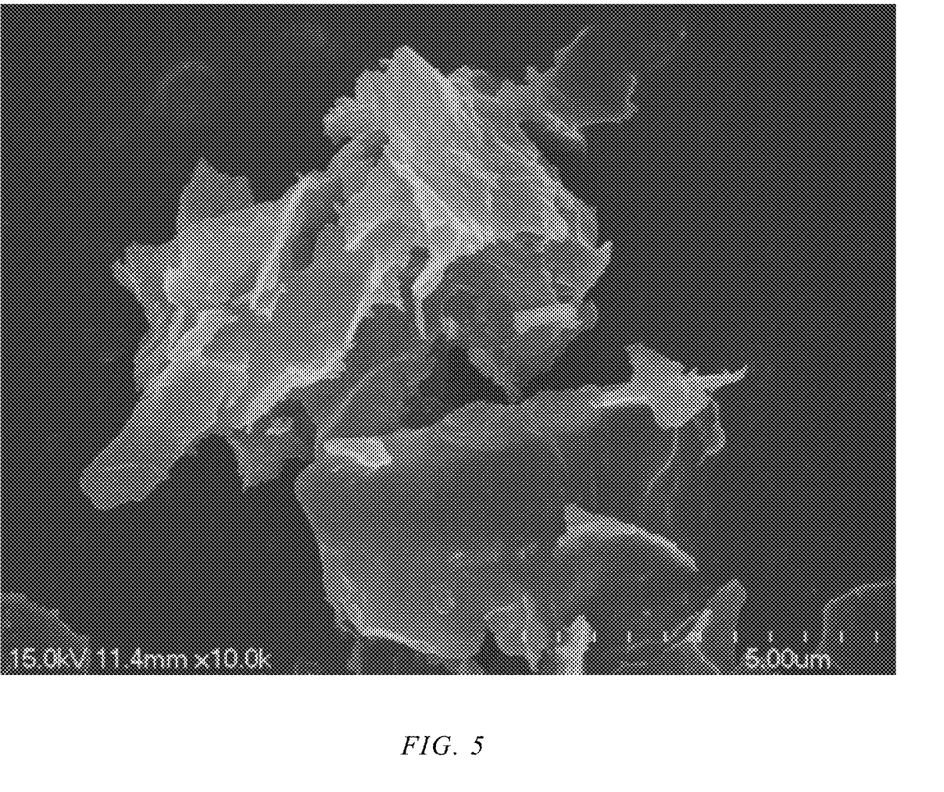
FIG. 5 is a SEM image of two-dimensional nitrogen-doped carbon-based titanium dioxide composite (2D N—(C/$TiO_2$)).

FIGS. 4 and 5 are TEM and SEM diagrams of two-dimensional nitrogen-doped carbon-based titanium dioxide composites, respectively. It can be seen from the figure that the calcination process does not break the layered skeleton of Ti$_3$C$_2$ nanosheet, the composite material maintains a two-dimensional layered morphology, and the two-dimensional carbon-based surface has obvious TiO$_2$ nanocrystal particles, uniform disperse on the surface. This indicates the successful preparation of a two-dimensional nitrogen-doped carbon-based titanium dioxide composite.

Embodiment 4

The two-dimensional nitrogen-doped carbon-based titanium dioxide composite is placed in simulated wastewater containing phenol, and the Xenon lamp is used as a light source for illumination for a certain period of time, and the curve of phenol concentration in water according to the illumination time is measured to evaluate the photocatalytic degradation effect for organic pollutants in water of the composite under visible light:

Adding the above prepared 50 mg two-dimensional nitrogen-doped carbon-based titanium dioxide composite 2D N—(C/TiO$_2$) to 50 mL of 20 ppm phenol in water, and stir for 1 h in the dark to achieve adsorption equilibrium. Then, the xenon light source is turned on to perform visible light catalytic degradation of phenol in water.

The specific phenol degradation effect is determined by an ultraviolet-visible spectrophotometer and calculated from the phenol concentration-absorbance operating curve. That is, the absorbance is measured by adding a coloring agent, the degradation efficiency is calculated from the absorbance, and the initial concentration of phenol is recorded as 100%, and then the concentration gradually decreases as the photocatalysis progresses, thereby obtaining a specific phenol degradation curve; After treating the 50 ppm phenol in water for 180 minutes, the phenol residual ratio is also less than 12%.

Figure 6:
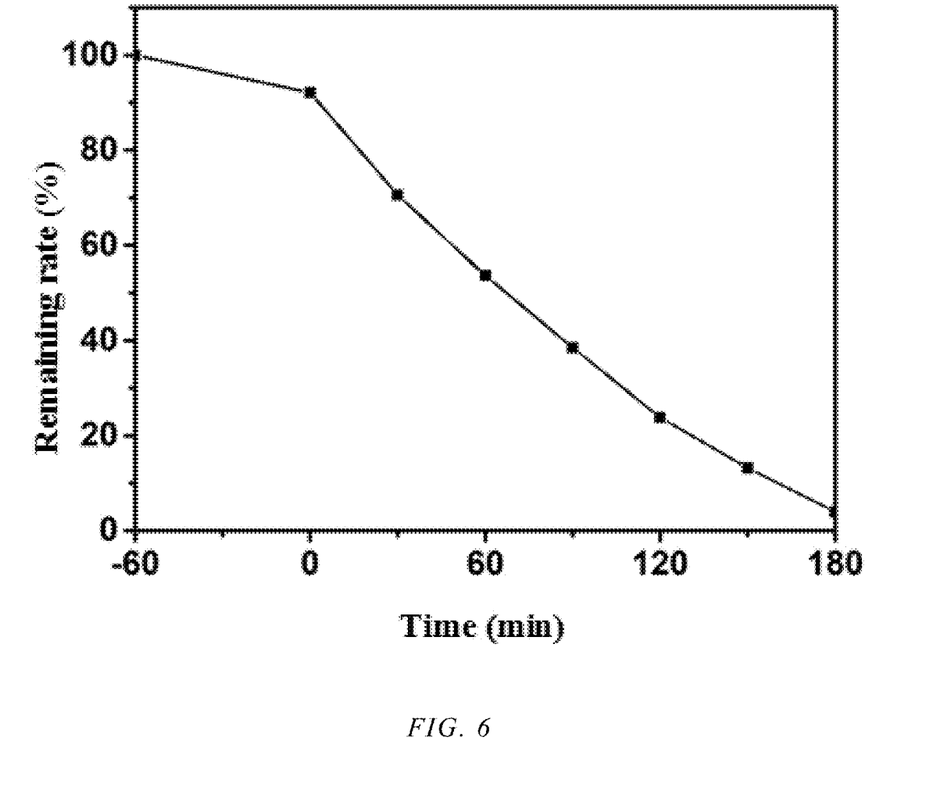
FIG. 6 is the image of the visible photocatalytic degradation of phenol by composite material (2D N—(C/$TiO_2$)) at room temperature.

FIG. 6 shows the degradation curve of 2D N—(C/TiO$_2$) on phenol in water. The first 60 minutes is the equilibrium adsorption time. The calculation method of phenol degradation rate is as follows:

$$D\% = \frac{A_0 - A}{A_0} \times 100\%$$

A$_0$ and A are the initial phenol absorbance and test absorbance in the experiment (tested every 30 minutes).

The invention adopts a surface electrostatic assembly of a two-dimensional layered crystalline compound (MXene) titanium carbide (Ti$_3$C$_2$) nanosheet containing a nitrogen-containing cationic compound as a raw material, and in situ constructs a two-dimensional nitrogen-doped carbon-based titanium dioxide composite material by a calcination method. Simultaneously achieving nitrogen doping of TiO$_2$ and its uniform loading on the surface of the carbon material, thereby increasing the absorption of TiO$_2$ in the visible range and its photo-quantum efficiency (the residual ratio of Ti$_3$C$_2$ MXene at 180 minutes is 88%), and overcoming the two major drawbacks of the TiO$_2$ photocatalyst at one time. It is possible to make TiO$_2$ photocatalysts more widely used in environmental purification.

We claim:

1. A preparation method of a two-dimensional nitrogen-doped carbon-based titanium dioxide composite material, comprising the following steps:
    (1) etching Ti$_3$AlC$_2$ with LiF/HCl to prepare a two-dimensional transition metal carbide nanosheet;
    (2) preparing a nanosheet aggregate by electrostatic self-assembly of the two-dimensional transition metal carbide nanosheet and a positively charged nitrogen-containing cationic compound;
    (3) calcining the nanosheet aggregate to prepare a two-dimensional nitrogen-doped carbon-based titanium dioxide composite material.

2. The method according to claim 1, wherein in the step (1), the molar ratio of Ti$_3$AlC$_2$ to LiF is (7-15):1; the concentration of HCl is 6-9 mol/L; the etching temperature is 20-35° C.; the etching time is 24-48 h; first adding LiF into HCl solution, stirring for 5 minutes to make the solution mix evenly, and then adding Ti$_3$AlC$_2$ for etching, the time of adding Ti$_3$AlC$_2$ is 5 min.

3. The method according to claim 2, wherein in the step (1), the molar ratio of Ti$_3$AlC$_2$ and LiF is 12:1; the concentration of hydrochloric acid is 9 mol/L; the etching temperature is 35° C.; and the etching time is 24 h.

4. The method according to claim 1, wherein in the step (2), the mass ratio of the positively charged nitrogen-containing cationic compound to the two-dimensional transition metal carbide nanosheet is 4:1.

5. The method according to claim 1, wherein the step (2) preparation of the nanosheet further comprises first preparing the nitrogen-containing cationic compound into a homogeneous solution, then mixing it with Ti$_3$C$_2$ MXene, stirring, centrifuging to get the precipitate, and freeze-drying to prepare nanosheet aggregate.

6. The method according to claim 1, wherein in the step (3), the nanosheet aggregate is roasted in a high temperature tube furnace, using CO$_2$ as the roasting atmosphere, the flow rate is 75-90 sccm, the roasting temperature is 550~700° C., the heating rate is 6-10° C./min, keeping the temperature for 2-4 h, and finally, the two-dimensional nitrogen-doped carbon-based titanium dioxide composite material is prepared by natural cooling.

7. A method for degrading and removing organic pollutants in water, comprising the following steps:
    (1) etching Ti$_3$AlC$_2$ with LiF/HCl to prepare a two-dimensional transition metal carbide nanosheet;
    (2) preparing a nanosheet aggregate by electrostatic self-assembly of the two-dimensional transition metal carbide nanosheet and a positively charged nitrogen-containing cationic compound;
    (3) calcining the nanosheet aggregate to prepare a two-dimensional nitrogen-doped carbon-based titanium dioxide composite material;
    (4) placing the two-dimensional nitrogen-doped carbon-based titanium dioxide composite material into water containing organic pollutants to degrade and remove organic pollutants in water.

8. The method according to claim 7, wherein in the step (4), said organic pollutants comprise phenol.

9. The method according to claim 7, wherein in the step (1), the molar ratio of $Ti_3AlC_2$ to LiF is (7-15):1; the concentration of HCl is 6-9 mol/L; the etching temperature is 20-35° C.; the etching time is 24-48 h; first adding LiF into HCl solution, stirring for 5 minutes to make the solution mix evenly, and then adding $Ti_3AlC_2$ for etching, the time of adding $Ti_3AlC_2$ is 5 min.

10. The method according to claim 9, wherein in the step (1), the molar ratio of $Ti_3AlC_2$ and LiF is 12:1; the concentration of hydrochloric acid is 9 mol/L; the etching temperature is 35° C.; and the etching time is 24 h.

11. The method according to claim 7, wherein in the step (2), the mass ratio of the positively charged nitrogen-containing cationic compound to the two-dimensional transition metal carbide nanosheet is 4:1.

12. The method according to claim 7, wherein the step (2) preparation of the nanosheet further comprises first preparing the nitrogen-containing cationic compound into a homogeneous solution, then mixing it with $Ti_3C_2$ MXene, stirring, centrifuging to get the precipitate, and freeze-drying to prepare nanosheet aggregate.

13. The method according to claim 7, wherein in the step (3), the nanosheet aggregate is roasted in a high temperature tube furnace, using $CO_2$ as the roasting atmosphere, the flow rate is 75-90 sccm, the roasting temperature is 550~700° C., the heating rate is 6-10° C./min, keeping the temperature for 2-4 h, and finally, the two-dimensional nitrogen-doped carbon-based titanium dioxide composite material is prepared by natural cooling.

* * * * *